July 9, 1940.  C. HENNESSEE  2,207,665
ALL PURPOSE FERTILIZER DISTRIBUTOR
Filed Feb. 2, 1939  2 Sheets-Sheet 1
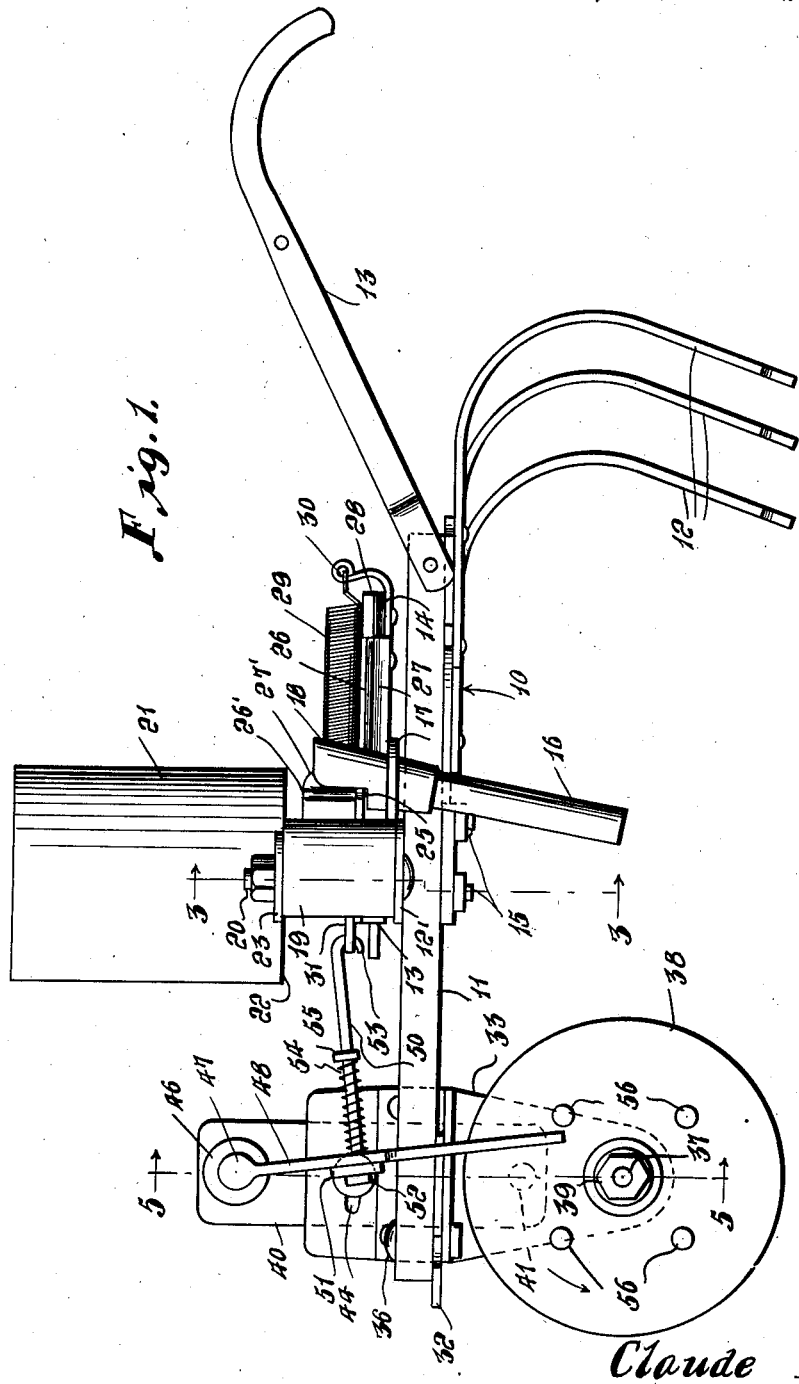
Inventor
Claude Hennessee
By L. F. Randolph
Attorney

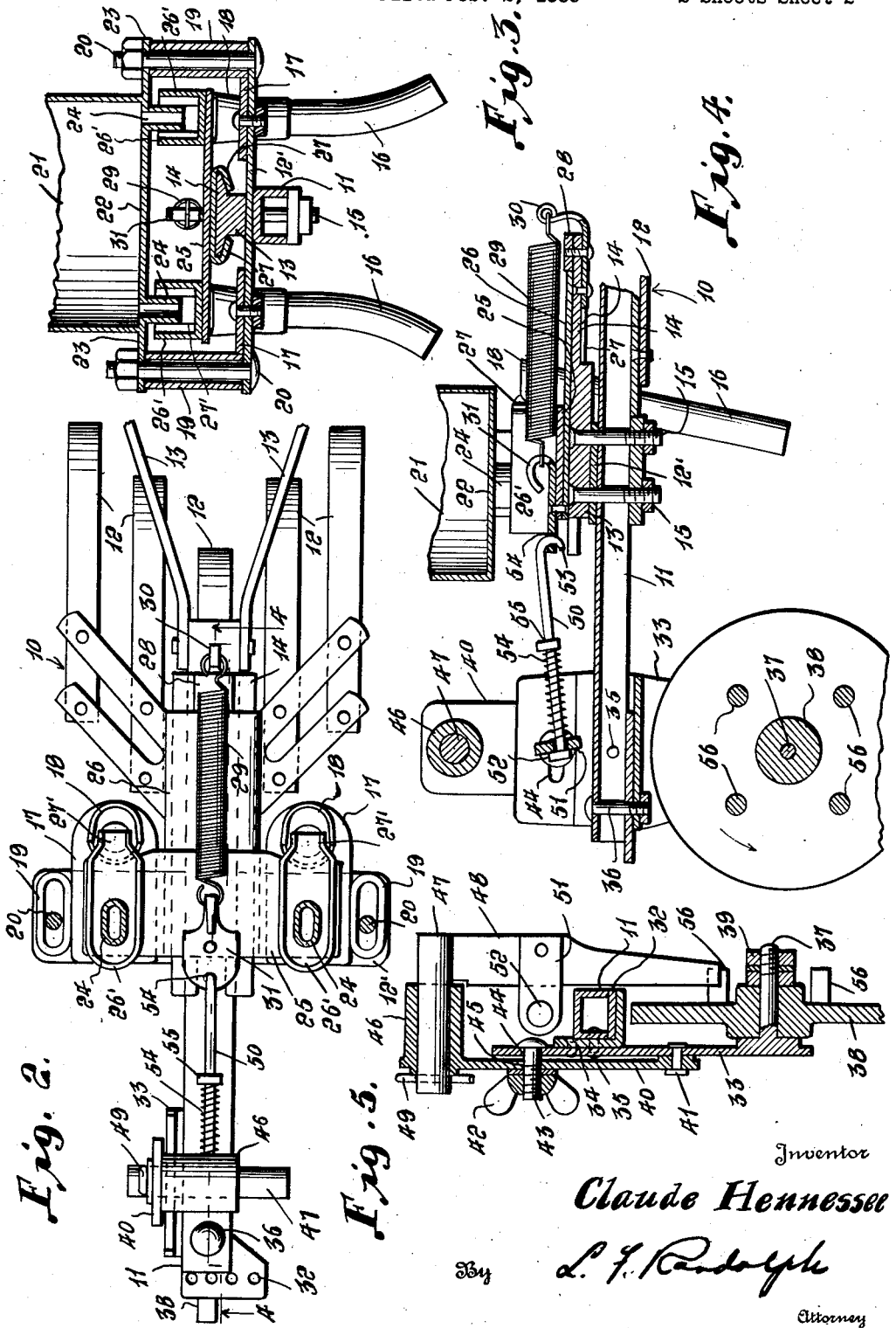

Patented July 9, 1940

2,207,665

UNITED STATES PATENT OFFICE 2,207,665

ALL PURPOSE FERTILIZER DISTRIBUTOR

Claude Hennessee, McMinnville, Tenn.

Application February 2, 1939, Serial No. 254,311

3 Claims. (Cl. 221—142)

This invention relates to a distributing machine or attachment primarily adapted for the distribution of fertilizer although capable of use for other materials.

It is aimed to provide a novel organization embodying parts particularly attachable to a cultivator although no limitation is to be inferred.

A further object is to provide such a machine wherein the material is moved on a level or straight line as contrasted with a circular path, a machine which operates by a draw rod in line with the draft, a construction wherein the discharge is effected by jarring and a construction which is adjustable, durable and efficient.

The more specific objects and advantages will become apparent from a consideration of the description following taken in connection with accompanying drawings illustrating an operative embodiment.

In said drawings:

Figure 1 is a side elevation of the improved machine;

Figure 2 is a view primarily in plan, with the hopper removed;

Figure 3 is a vertical sectional view taken on the plane of line 3—3 of Figure 1;

Figure 4 is a vertical longitudinal section taken substantially on the plane of line 4—4 of Figure 2, and Figure 5 is a vertical section taken on the line 5—5 of Figure 1.

Referring specifically to the drawings wherein like reference characters designate like or similar parts, the invention is shown as applied to a conventional cultivator generally designated 10. Of this cultivator, 11 represents the longitudinally extending main beam from the rear of which the tines or blades 12 are supported. Handle bars 13 rise from the rear end of such beam 11.

My improvements are shown as an attachment for the cultivator or equivalent although it is to be understood that it may be built into any type of machine initially. A transverse or cross plate 12' is disposed on the beam 11 and spaced above the same by an interposed member 13 is a longitudinal plate or track member 14 which is relatively wide as shown. Such member 13 may be integral with the plate 14 if desired. Any suitable number of bolts or other fastenings 15 are passed through the plate 14, part 13 and beam 11. Drills or discharge tubes 16 depend from brackets 17 which extend rearwardly from the cross plate 12' and U-shaped guards 18 rise from the brackets 17 at the entrances to the drills or tubes 16.

Tubular risers or spacers 19 extend upwardly from the cross plate 12' adjacent its ends and bolts 20 extend upwardly therethrough. Disposed on the risers 19 is a hopper 21 for the fertilizer or other material to be distributed. Such hopper has a bottom wall 22 which is provided with laterally extending ears 23 directly resting on the risers 19 and through which the bolts 20 pass to secure the hopper in place. Such hopper bottom 22 has outlet tubes or spouts 24 depending therefrom. A discharge plate 25 has an auxiliary plate 26 secured thereto whose sides are formed into flanges 27 overlapping the side edges of the track member 14 and slidably mounting the discharge plate 25 for longitudinal movement thereon.

Said discharge plate carries a pair of U-shaped boxes or shuttles 26' preferably constricted at their rear ends as at 27' and best shown in Figure 2. The aforesaid tubes or spouts 24 extend into the boxes or shuttles 26' but terminate above the base thereof as best shown in Figure 3. The discharge plate and associated parts are shown in rearmost position in Figure 2 and are urged to that position and into contact with an abutment 28 on the upper forward portion of track 14, by a contractile coil spring 29 at one end engaging a hook 30 on the track member 14 and at the other end engaging a hook or bracket 31 on the discharge plate.

The aforesaid discharge plate is adapted to be operated through the travel of a ground wheel as the cultivator is drawn along by suitable power connected to a clevis 32 located at the forward end of the beam 11. To this end a bracket or standard 33 has an angle member 34 riveted thereto at 35, one angle of which extends across the under surface of beam 11 and one or more bolts 36 pass through such flange and beam. A horizontal stub shaft or spindle extends from the standard 33 at 37 and a ground wheel 38 is journaled thereon, being secured against displacement by nuts or the like 39 threaded to the stub shaft or axle 37. On standard or bracket 33, a bearing arm 40 is pivotally connected at 41 but adapted to be secured in adjusted positions by means of a wing nut 42 threaded to a bolt 43 passing through slots 44 and 45 in the standard 33 and bearing arm 40, respectively, one or both of which slots may be arcuate or enlarged.

A bearing sleeve 46 extends from the upper end of arm 40 and a lug 47 of a generally perpendicular tappet arm 48 is journaled therein, being secured against displacement as by means of a cotter 49. A longitudinally extending draw rod 50 passes loosely through an ear 51 on tappet arm 48, having a head 52 in front of the ear and having a hook 53 engaging an opening 54 in the bracket 31. In order to permit backing of the wheel 38 and of the tappet arm 48 at times, an expansive coil spring 54 surrounds the draw rod 50, abutting the ear 51 and an abutment 55 on the rod.

Projecting laterally and equidistantly from one side of the wheel 38, are tappet pins 56 which are arranged to strike the lower end of the tappet arm 48 as the cultivator moves forwardly, that is in the direction of the arrow of Figure 4. Each time a pin 56 strikes the tappet arm 48, such arm through the medium of the rod 50, draws the discharge plate 25 forwardly. When such tappet arm is released by a pin, the spring 29 will forcibly move the discharge plate rearwardly with considerable impact or jar against the abutment 30, such impact or jar causing material in the shuttles 26' to be discharged therefrom rearwardly against the guards 18 and to then fall through the drills or tubes 16 to the ground.

I find that the spouts or tubes 24 arranged as described, will not overflow the shuttles but will effectively maintain a constant supply of the fertilizer or material in the shuttles.

When the quantity of material to be delivered through the shuttles 24 requires increase or decrease, the movement imparted to the discharge plate 25 may be varied, through the swinging adjustment of the bearing arm 40 on pivot 41, the same being rigidly fastened in place by the nut 42 and bolt 43.

Obviously the principles of the invention may be practiced where a single discharge spout 24 is used with associated parts, as well as with the plurality as shown.

Various changes may be resorted to provided they fall within the spirit and scope of the invention.

I claim as my invention:

1. Distributing means of the class described in combination with a beam, a cross plate on the beam, a track plate above the cross plate, means securing said plates to the beam, spacer members rising from the cross plate and terminating above the track plate, a hopper secured to the upper ends of the spacer members having a discharge opening, a discharge plate slidably mounted on the track plate having a shuttle open at the rear in the line of discharge from the hopper, a drill member fastened to the cross plate, abutment means on the track member, and means to forcibly move the discharge plate against said abutment means to impart a jar to discharge material from the shuttle member into said drill member.

2. Distributing means of the class described in combination with a beam, a cross plate on the beam, a track plate above the cross plate, means securing said plates to the beam, spacer members rising from the cross plate and terminating above the track plate, a hopper secured to the upper ends of the spacer members having a discharge opening, a discharge plate, an auxiliary plate beneath and rigid with the discharge plate, said track member having laterally extending flanges, said auxiliary plate having side portions overlapping said flanges and slidably mounting the discharge plate on the track plate, said discharge plate having a shuttle open at the rear in the line of discharge from the hopper, a drill member fastened to the cross plate, abutment means on the track member, and means to forcibly move the discharge plate against said abutment means to impart a jar to discharge material from the shuttle member into said guard drill member.

3. Distributing means of the class described in combination with a beam, a cross plate on the beam, a track plate above the cross plate, means securing said plates to the beam, spacer members rising from the cross plate and terminating above the track plate, a hopper secured to the upper ends of the spacer members having a discharge opening, a discharge plate, an auxiliary plate beneath and rigid with the discharge plate, said track member having laterally extending flanges, said auxiliary plate having side portions overlapping said flanges and slidably mounting the discharge plate on the track plate, said discharge plate having a shuttle open at the rear in the line of discharge from the hopper, a drill member fastened to the cross plate, abutment means on the track member, means to forcibly move the discharge plate against said abutment means to impart a jar to discharge material from the shuttle member into said drill member, said hopper having a bottom wall integral with the side wall thereof, tubes extending from said bottom wall integral therewith and into the shuttle, and ears integral with the hopper disposed directly over said spacer members.

CLAUDE HENNESSEE.